May 10, 1938.    W. D. BLATZ    2,117,137
BEAD CHAIN LENGTH ADJUSTER
Filed Jan. 27, 1938

INVENTOR
WARREN D. BLATZ
BY HIS ATTORNEYS
Howson and Howson

Patented May 10, 1938

2,117,137

UNITED STATES PATENT OFFICE 2,117,137

BEAD CHAIN LENGTH ADJUSTER

Warren D. Blatz, Bridgeport, Conn., assignor to The Bead Chain Manufacturing Company, Bridgeport, Conn., a corporation of Connecticut Application January 27, 1938, Serial No. 187,331

6 Claims. (Cl. 59—78.1)

This improved adjuster is adapted to be used with bead chain of known type such as that shown in Gagnon Patent 1,078,494 consisting of hollow balls with connecting dumb-bell links.

In using bead chain it is often important that the length of the strands be adjusted with precision. This is particularly important where several strands are used together as, for example, in the suspension of reflectors or of light diffusion bowls used on electrical illuminating fixtures, in order that the suspended parts may be held level.

Due to several variables encountered in the manufacture of chain of this type, such as variations in temper and gauge of metal and variable tool conditions, it has been found impossible to produce chain commercially with a given number of beads per foot. The usual method of adjusting the length is to cut off part of the chain in order to obtain the proper level of the fixture. However in making an accurate adjustment, it often happens that cutting off even a single unit of the chain shortens the chain too much.

It follows that a great waste of time, labor and material is often entailed before accurate adjustment of length of the bead chain is achieved.

An object of the invention is to adjust the length of bead chain while still retaining the chain in one piece.

A further object is to increase the speed of adjusting lengths of bead chain.

Other objects will appear from the specification, of which the following drawing forms a part:

Figure 1:
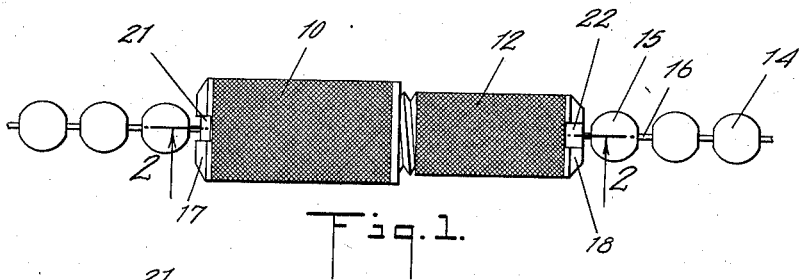
Figure 1 is a plan view of the novel adjuster shown applied to a length of bead chain.

As illustrated in the drawing, the novel adjuster consists of a sleeve 10 internally threaded at 11 to receive a barrel 12 externally threaded at 13. Both the elements 10 and 12 are bored out to a diameter large enough for a bead chain 14 to be passed through them. The chain 14 composed of beads 15 and links or "dumb-bells" 16 passes through both elements 10 and 12 of the adjuster. Any desired length of chain 14 may project from free end 17 of sleeve 10 or from free end 18 of barrel 12.

Figure 4:
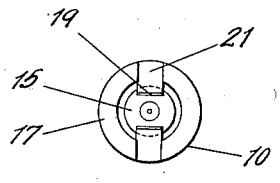
Figure 4 shows an end elevation of the adapter, looking in the direction of the arrow pointing towards the line 4—4 of Fig. 3.
Figure 5:
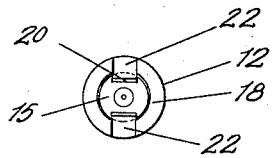
Figure 5 shows an end elevation of the other end of the adapter, looking in the direction of the arrow pointing toward the line 5—5 of Fig. 3.

The adjuster may be retained on the chain 14 by any suitable bead retaining means such as a throat 19 or 20 too small to permit a bead 15 to pass through. Any convenient type of retaining means or throat may be employed. In Figure 4 throat 19 on sleeve 10 comprises tongues 21. In Figure 5 the throat 20 on barrel 12 comprises tongues 22. Thus, even if the sleeve 11 and barrel 12 become completely disengaged from each other, the adjuster may be retained on the chain, for the throats 19 and 20 of the respective parts will ride on a link 16, but will not pass over a bead 15.

Figure 2:
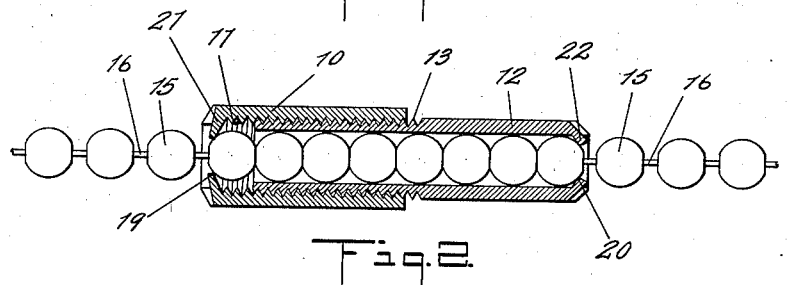
Figure 2 is a longitudinal section of the line 2—2 of Fig. 1, the beads of the chain being left in elevation, and being shown pressed together or tangent to one another.
Figure 3:
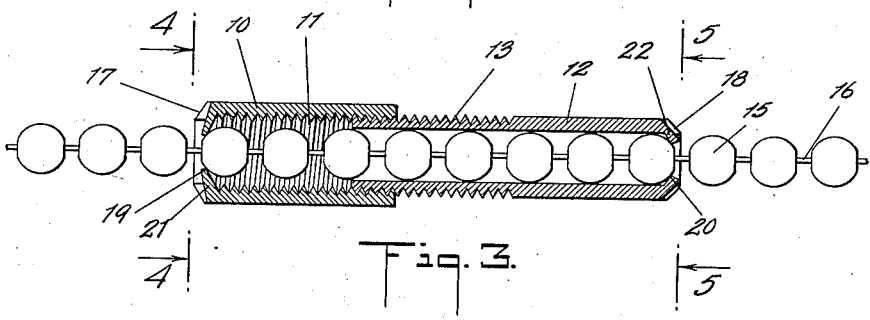
Figure 3 is a section similar to Fig. 2, but shows the adjuster in such a position that the beads are pulled away from each other to the extreme limits allowed by their connecting links.

The novel adapter takes advantage of the difference between the distance from center to center of the bead elements 15 when said elements are pressed together or tangent to one another as shown in Fig. 2, and the distance from center to center when they are pulled apart to the extreme allowed by the enclosed connecting links 16, as shown in Fig. 3.

The sleeve 10 and barrel 12 are made long enough to receive several beads 15. In the drawing, they are shown accommodating eight beads, but the number is optional, and can be either increased or decreased. The cooperating threaded portions 11 and 13 of the respective sleeve 10 and barrel 12 respectively, are sufficiently long that the adjuster can be extended, so that the beads 15 therein are pulled apart the maximum distance allowed by their connecting links 16, as shown in Fig. 3, or can be contracted, so that the beads 15 therein are tangent to each other, as shown in Fig. 2.

The novel adjuster provides adjustments to any degree of fineness over a range beyond the maximum variation found in the chain. A further advantageous safety factor is that even though the elements 10 and 12 comprising the adjuster should be completely unscrewed and separated from each other, as they could be before they contacted adjacent exterior beads 15, the suspended fixture could not drop, because the chain 14 is still intact.

I claim:

1. A length-adapter for bead chain, comprising cooperating elements on said chain and containing a plurality of beads and links of said chain and having cooperating telescoping means on said elements of such length that in expanded position of the adapter, the beads therein are separated from each other by the maximum distance allowed by their connecting links, and in contracted position of the adapter the beads are tangent to each other.

2. A length-adapter for bead chain, comprising cooperating elements on said chain and containing a plurality of beads and links of said chain and having cooperating telescoping means on said elements of such length that in expanded position of the adapter, the beads therein are separated from each other by the maximum distance allowed by their connecting links, and in contracted position of the adapter the beads are tangent to each other, each element having a throat too small to admit a bead of the chain.

3. An adapter in combination with a bead-chain having hollow beads and "dumb-bell" type connecting links, said adapter comprising cooperating hollow elements surrounding a plurality of said beads, a restricted portion smaller than said beads, on said adapter and cooperating screw threaded portions on said elements whereby the adapter is shortened thereby pressing the beads toward each other so that they are spaced apart by distances shorter than the lengths of their connecting links.

4. A bead chain having beads connected by "dumb-bell" links in combination with an adapter comprising a pair of hollow elements containing a plurality of beads of said chain, means on said adapter to prevent its passing over a bead, and cooperating means on said elements whereby said adapter is telescoped until the beads within it are tangent to each other, or expanded until the beads within are separated as far as their connecting links will permit.

5. A bead chain having beads connected by "dumb-bell" links in combination with an adapter comprising a sleeve and a cooperating barrel upon said chain and containing a plurality of said beads of said chain, and means on said adapter which prevents the passage of a bead therethrough, cooperating screw threaded portions on said sleeve and barrel whereby the length of the adapter may be decreased or increased, whereby the beads within the adapter are pressed together as the adapter is shortened.

6. A bead chain having beads connected by "dumb-bell" links in combination with an adapter comprising a sleeve and a cooperating barrel upon said chain and containing a plurality of said beads of said chain, and means on said adapter which prevents the passage of a bead therethrough, cooperating screw threaded portions on said sleeve and barrel whereby the length of the adapter may be decreased or increased, whereby the beads within the adapter are pressed together as the adapter is shortened and are allowed to separate to the extent of the length of the links as the adapter is lengthened.

WARREN D. BLATZ.